May 1, 1934. G. C. BABCOCK ET AL 1,956,970
BOX AND CRATE
Filed July 20, 1932    5 Sheets-Sheet 1

INVENTORS
Guilford C. Babcock
Earl R. Stivers
BY Janney, Blair & Curtis
ATTORNEYS.

May 1, 1934. G. C. BABCOCK ET AL 1,956,970
BOX AND CRATE
Filed July 20, 1932   5 Sheets-Sheet 2

INVENTORS
Guilford C. Babcock
Earl R. Stivers
BY Janney, Blair & Curtis
ATTORNEYS.

May 1, 1934. G. C. BABCOCK ET AL 1,956,970
BOX AND CRATE
Filed July 20, 1932   5 Sheets-Sheet 3

INVENTORS
Guilford C. Babcock
Earl R. Stivers
BY Janney, Blair & Curtis
ATTORNEYS.

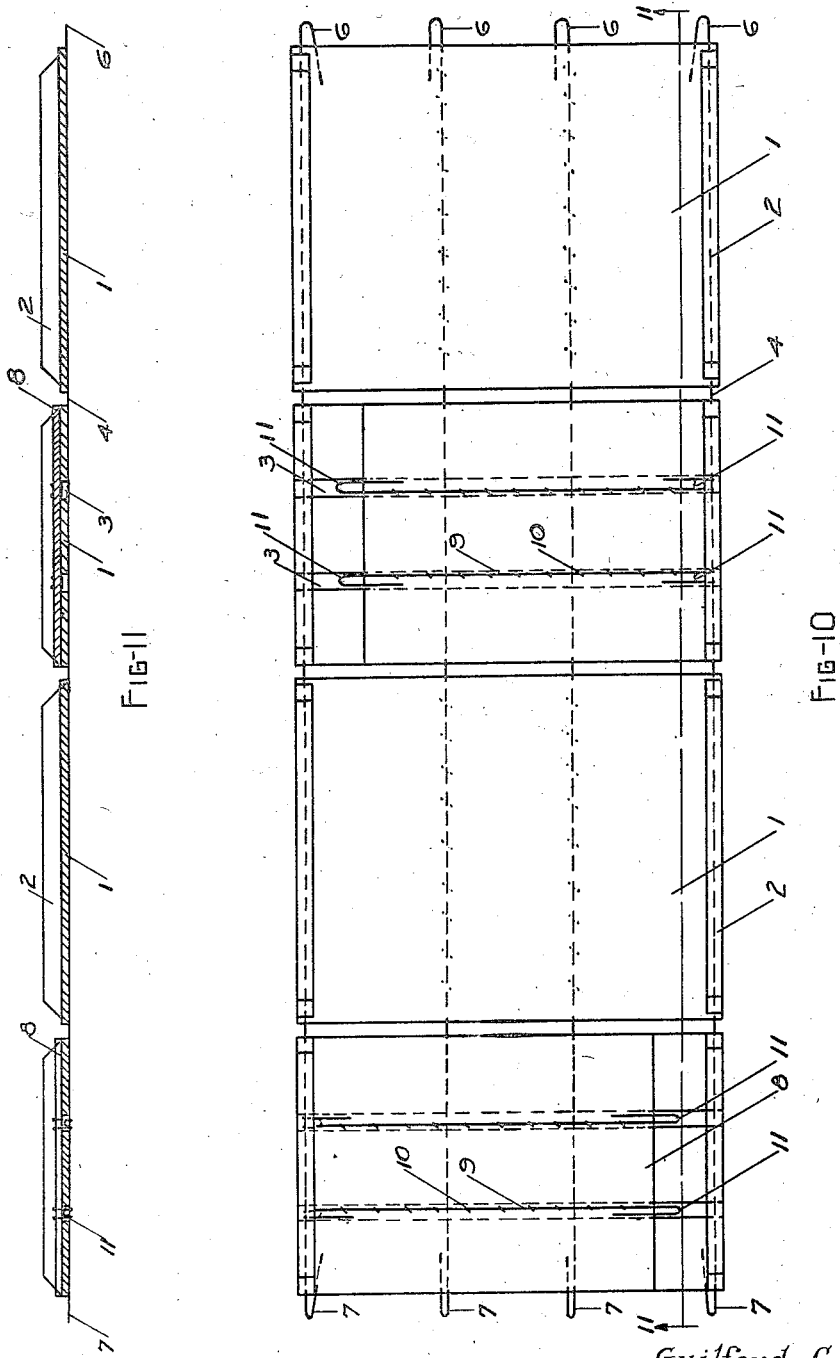

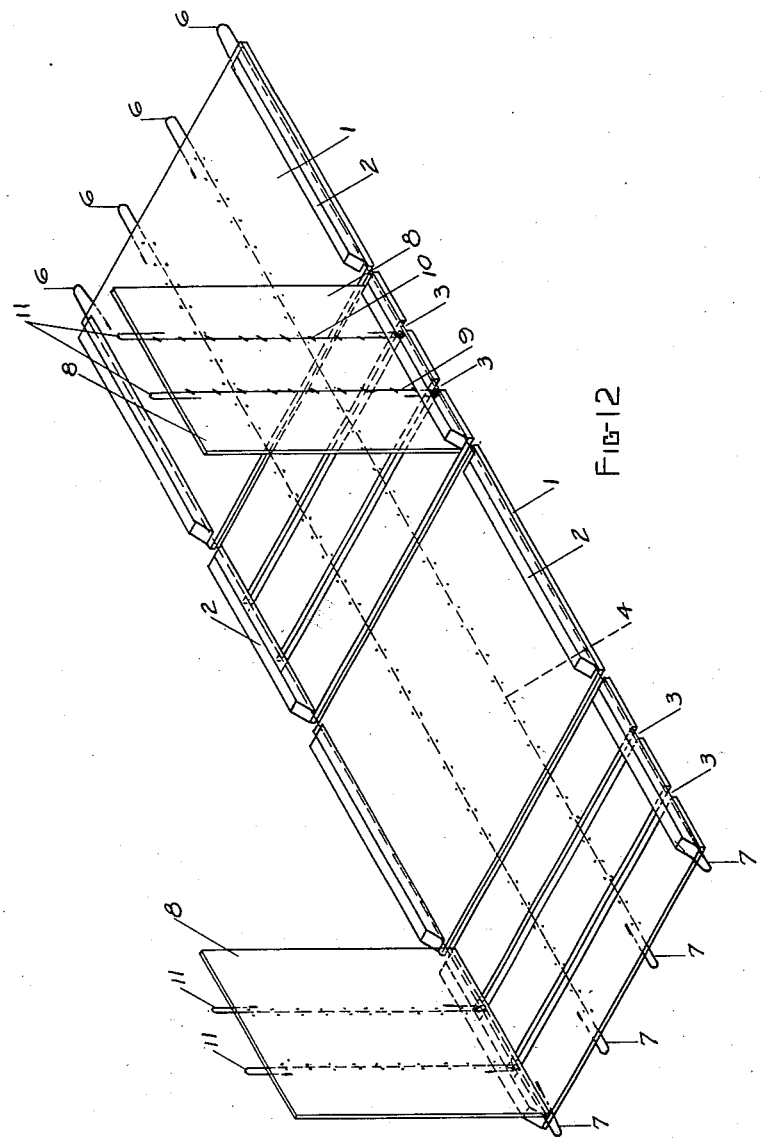

Patented May 1, 1934

1,956,970

UNITED STATES PATENT OFFICE 1,956,970

BOX AND CRATE

Guilford C. Babcock, Morris Township, Morris County, and Earl R. Stivers, Rockaway, N. J., assignors to Stapling Machines Co., a corporation of Delaware Application July 20, 1932, Serial No. 623,500

23 Claims. (Cl. 217—12)

This invention relates to boxes and crates and particularly to wirebound boxes and crates.

It is an object of the invention to provide certain improvements in a wirebound box or crate whereby the lumber required is reduced to a minimum by substituting inexpensive wire for an excess of wood on all sides of the box.

It is a further object to provide a wired end for a wirebound box which may be readily secure to the box sides without the use of nails, staples or the like, and which may be readily removed and again inserted.

It is a further object to provide a wirebound box or crate in which the wires on the ends may cooperate with the wires on the sides in a unique manner to increase the strength of the box or crate as a whole.

It is a further object to provide an improved method of making wirebound boxes and of securing the ends thereto.

In the drawings:

Fig. 10 is a top plan view of a crate blank which, when folded, constitutes the four sides and two ends of the crates shown in Fig. 1.

Fig. 11 is a section on the line 11—11 of Fig. 10.

Fig. 12 is a perspective view of the blank of Fig. 10 with the end sections raised to cooperate with the sides when the latter are folded into box form.

Figure 1:
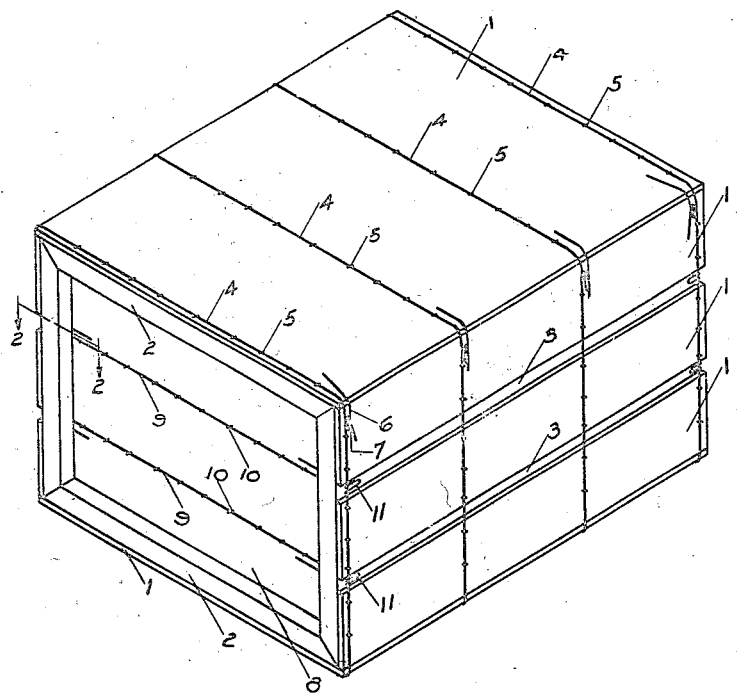
Figure 1 is a perspective view of a wirebound crate embodying the invention.

Referring to Fig. 1, the illustrative crate comprises four side sections and two end sections. The side sections consist of thin sheets of side material 1, preferably of rotary cut veneer or resawed lumber, and end cleats 2 secured to the under sides of the sheet 1 as shown. The sheets 1 on the front and rear sides are spaced from each other to provide ventilating openings 3. Similar openings may be provided in the top and bottom side sections if desired. The four sections are encircled by flexible binders 4 (preferably wires) which are stapled to the side sheets 1 by staples 5.

In the illustrative box, the two ends of each encircling binder 4 meet at the closing corner of the crate, as shown in Fig. 1. To provide means for connecting the wire ends the wire on the top side is bent to form a bight 6 and the wire on the front side is bent to form a bight 7, the bight 7 is being somewhat narrower than the bight 6 and adapted to be hooked through the bight 6. The bights 6 and 7 are perpetuated by driving the ends of the binder 4 through a side sheet 1 and clinching the end of the binder on the under side of the sheet. Such a connecting means buries the sharp ends of the binder and provides a fastener which may be readily opened and closed.

Figure 2:
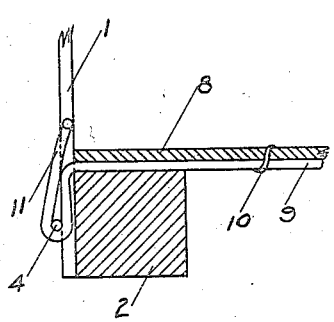
Fig. 2 is an enlarged sectional view taken on the line 2—2 of Fig. 1 and showing the manner of connecting the wires on an end section to a wire on a side section.
Figure 3:
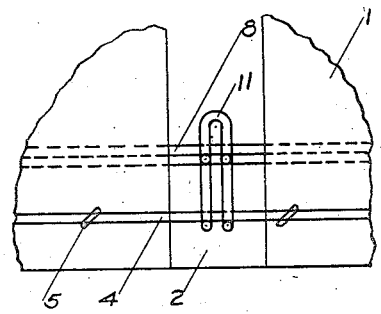
Fig. 3 is an enlarged front elevation of a portion of one side of the crate showing the manner of attaching an end section to a side section.
Figure 5:
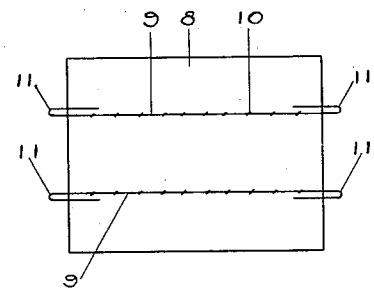
Fig. 5 is a top plan view of a wired end section for the crate.
Figure 7:
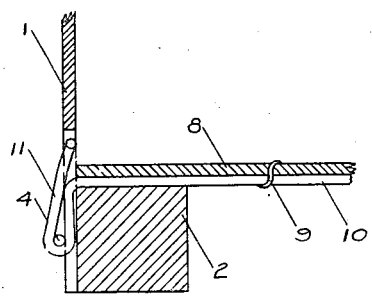
Fig. 7 is an enlarged sectional view taken on the line 7—7 of Fig. 6.
Figure 8:
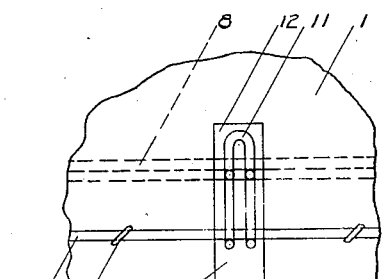
Fig. 8 is an enlarged front elevation of a portion of one side of the box and showing the manner of attaching the end section to a side section.
Figure 6:
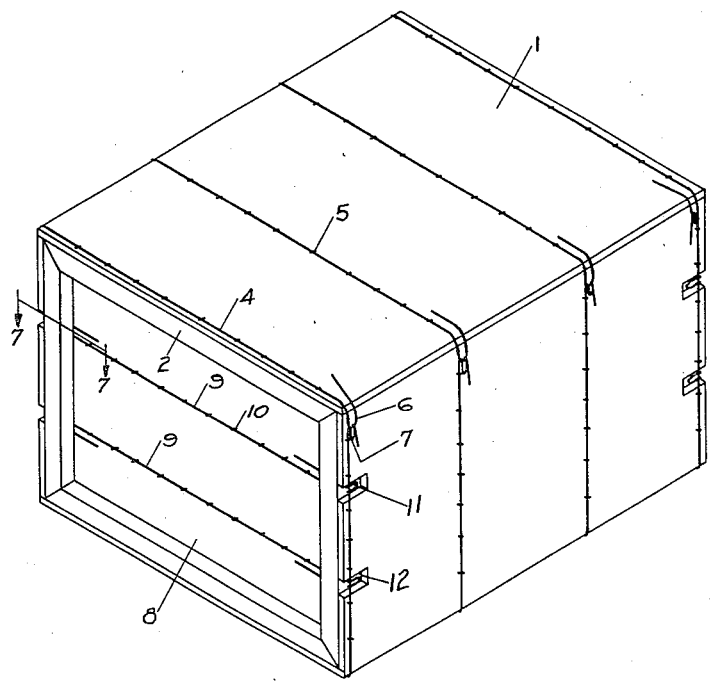
Fig. 6 is a perspective view of a wirebound box embodying the invention.
Figure 9:
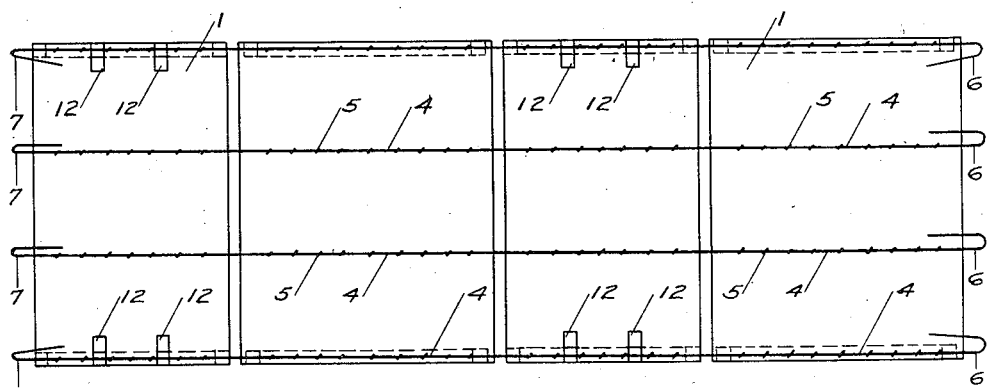
Fig. 9 is a top plan view of a box blank which, when folded, constitutes the four sides of the box shown in Fig. 6.

Referring to Fig. 5, each end section consists of a thin sheet 8 of veneer or resawed lumber and one or more flexible binders 9 (preferably wires) stapled to the sheet 8 by staples 10. The ends of each wire 9 are bent to form bights 11 which are perpetuated by driving the ends of the wire through the sheet 8 and clinching the wire end on the under side of the sheet 8. The wires 9 on the end sections preferably are positioned so that the bights 11 will register with the openings 3 in the side sections when the end sections are inserted in the crate. As best shown in Figs. 1, 2 and 3, the bights 11 on the end sections preferably are passed through the openings 3 and inserted between a side wire 4 and a cleat 2 and are hooked or bent over said wire 4. The end section rests against the inner faces of the end cleats 2 and is held in position by the engagement between the bights 11 and the side binding wire 4. This arrangement permits the use of end cleats 2 of greatly reduced cross-sectional dimensions. Heretofore it has been necessary to employ end cleats having substantial cross-sectional dimensions in order to provide anchorage for the staples which were driven into such cleats to hold the end section in place. The wires 9 of the end section reenforce and strengthen the end against bulging and other strains and thus eliminate the necessity of using expensive reenforcing battens for the end sections. The wires 9 of the end section when attached at both ends to the binding wire 4 on the side sections not only increase the resistance of the end section to stresses and strains, but also increase the resistance of the sides to such strains. For example, an interior bulging strain exerted by a shifting of the contents of the crate tends to cause the side binding wires 4 to assume a circular formation. Such tendency is resisted strongly by the two wires 9 on the end sections which engage the binding wires 4 at opposite sides of the crate and thereby resist a bulging of the wires 4 at the points of attachment thereto.

Figure 4:
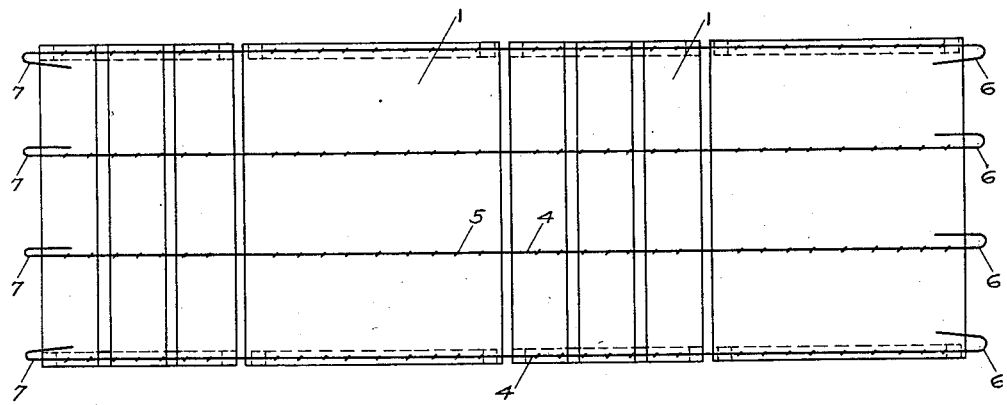
Fig. 4 is a top plan view of a crate blank which, when folded, constitutes the four sides of the crate shown in Fig. 1.

In practice the crate blank shown in Fig. 4 is usually shipped to the user in the flat and is folded by the user into four-sided crate form. The end sections shown in Fig. 5 may be shipped separately and inserted and attached to the sides by the user in the manner hereinbefore described, or the ends may be secured to the flat blank and shipped therewith by hooking the bights 11 on one side of the end section to one section of the blank, as shown in Fig. 10. The blank may then be set up in box form by folding three of the side sections into a three-sided box form, swinging the end sections into closing position, passing the unattached bights 11 through the side section, bending the bights to connect the end to the sides and (after the contents have been inserted) folding the fourth side section into closing position. The bights 6 and 7 of the wires 4 may then be connected to hold all parts in box formation. When shipping the six-section blank of Fig. 10, the end sections 8 are conveniently folded over onto the side section to which they are connected, as shown in Fig. 10, and when the blank is folded into box form the ends are raised as shown in Fig. 12 to cooperate with the sides when the latter are folded at right angles to each other.

Referring to Figs. 6 to 9, the box embodying the invention is similar to the crate except that the side material 1 is integral on all sides instead of being spaced to provide openings for ventilation. To permit the bights 11 on the end sections to be passed through the side material and bent to hold the end in position, the front and rear sides of the box may be provided with openings 12 through which the bights 11 may be passed and hooked to the wires 4 or otherwise bent to hold the end in position.

It should be noted that all six sides of the box or crate have flexible binders secured thereto, and that the binders on the ends pass through the sides and between a cleat and a side binder and are bent to connect the ends to the sides, and that such an arrangement increases the resistance of the sides and ends to strains and thus permits the use of thinner and less expensive side sheets, end sheets and cleats. The attachment of the ends to the sides by means of the wires on the ends eliminates the use of staples or the like for fastening the ends to the cleats of the sides and thus permits the use of cleats which are of smaller cross-sectional dimensions.

It should also be noted that the all-wired arrangement permits a ready insertion and removal of the end sections and also permits the end sections to be connected to the side sections in the flat for shipment to the customer. Thus the four sides and the two ends reach the customer as a unit in the flat and need only to be folded into container form and secured in that form by manipulating the bights on the wire ends in the manner described. Such a unitary delivery prevents misplacement or loss of parts of the box or crate.

It will be understood that the invention is not to be limited to the particular embodiment thereof shown for illustration, as features of the invention may be used in various combinations as defined in the sub-joined claims.

We claim:

1. A wirebound box comprising four side sections encircled by binding wires secured thereto and adapted to be detachably connected at their ends; an interior cleat frame at either end of the box secured to the inner surfaces of the side sections; an end section positioned within and resting against the interior cleat frame at either end of the box; and a plurality of wires secured to the outer face of each end section and extending through opposite side sections and connected to a side section encircling wire.

2. A wirebound box comprising a plurality of side sections encircled by binding wires secured thereto and adapted to be connected at their ends; an interior cleat frame at either end of the box secured to the inner surfaces of the side sections; an end section positioned within and resting against the interior cleat frame at either end of the box; and a plurality of wires secured to the outer face of each end section and extending through opposite side sections and connected to a side section encircling wire.

3. A wirebound box comprising a plurality of side sections encircled by binding wires secured thereto and adapted to be connected at their ends; an interior cleat frame at either end of the box; an end section positioned within the box sides adjacent an interior cleat frame; a plurality of wires secured to the end section and extending through opposite side sections and detachably connected to a side section wire.

4. A wirebound box comprising a plurality of side sections encircled by binding wires secured thereto and adapted to be connected at their ends; an interior cleat frame at either end of the box; an end section positioned within the box sides adjacent an interior cleat frame; a plurality of wires secured to the end section and extending through opposite side sections and connected to a side section wire.

5. A metalbound box comprising a plurality of side sections encircled by flexible binders secured thereto, and an end section having a plurality of flexible binders secured thereto and extending beyond opposite edges thereof and passing through opposite side sections and engaging a flexible binder on the side sections, whereby the sides and the end are reenforced by engaging and cooperating flexible binders.

6. A foldable box blank comprising a plurality of side sections connected together in foldable relationship by flexible binders extending across the several sections and secured thereto; two end sections each provided with flexible binders secured thereto and extending beyond opposite edges thereof, one end of the binders on each end section being passed through a side section and connected to a binder on the outside of said section in such manner as to permit the end section to be swung into end closing position, whereby when the side sections are folded into box form, the unattached ends of the binders on the end section may be connected to a binder on a side section to secure the end section in closing position.

7. A foldable box blank comprising a plurality of side sections connected together in foldable relationship by flexible binders extending across the several sections and secured thereto; an end section provided with flexible binders secured thereto and extending beyond opposite edges thereof, the binders on the end section being passed through a side section and connected to a binder on the outside of said section with a hooking engagement to permit the end section to be swung into end closing position when the side sections are folded into box form.

8. The method of making a wirebound box which consists in stapling binding wires to four side sections in the flat; stapling binding wires to an end section to extend beyond opposite edges thereof; folding three of the side sections into a three-sided box form; positioning the end section within the three-sided box form with its wire ends extending toward opposing sides of the three-sided box form; passing one end of the wires on the end section through a side section and the other end of said wires through the opposite side section; and hooking the wires on the end section to a wire on the side sections.

9. The method of making a wirebound box which consists in stapling binding wires to four side sections in the flat; stapling binding wires to an end section to extend beyond opposite edges thereof; folding three of the side sections into a three-sided box form; positioning the end section within the three-sided box form with its wire ends extending toward opposing sides of the three-sided box form; passing one end of the wires on the end section through a side section and the other end of said wires through the opposite side section; and connecting the wires on the end section to a wire on the side sections.

10. The method of making a wirebound box which consists in stapling binding wires to four side sections in the flat; stapling binding wires to an end section to extend beyond opposite edges thereof; folding three of the side sections into a three-sided box form; positioning the end section within the three-sided box form with its wire ends extending toward opposing sides of the three-sided box form; passing one end of the wires on the end section through a side section and the other end of said wires through the opposite side section; and detachably connecting the wires on the end section to a wire on the side sections.

11. The method of making a wirebound box which consists in securing flexible binders to a plurality of side sections in the flat; securing flexible binders to an end section to extend beyond opposite sides thereof; folding the side sections about the end section; passing one end of the binders on the end section through a side section and the other end of said binders through an opposite side section and connecting the binders on the end section to a binder on the side sections.

12. The method of making a wirebound box which consists in stapling binding wires to four side sections in the flat; stapling binding wires to an end section to extend beyond opposite edges thereof; passing one end of the binding wires on the end section through a side section and hooking said wire ends over a wire on said side section; folding three of the side sections into three-sided box form; swinging the end section into position to close the box end; passing the other end of the binding wires on the end section through their adjacent side section and hooking said wire ends over a wire on said side section; and folding the fourth side section into box form.

13. The method of making a wirebound box which consists in stapling binding wires to four side sections in the flat; stapling binding wires to an end section to extend beyond opposite edges thereof; passing one end of the binding wires on the end section through a side section and hooking said wire ends over a wire on said side section; folding three of the side sections into three-sided box form; swinging the end section into position to close the box end; passing the other end of the binding wires on the end section through their adjacent side section and detachably connecting said wire ends to a wire on said side section; and folding the fourth side section into box form.

14. The method of securing a wired end to a wired box side which consists in passing the ends of the wires on the box end through the box side and hooking said ends over a wire on the outside of the box side.

15. The method of securing a wired end to wired box sides which consists in positioning the box end within the box sides; passing the ends of the wires on the box end through oppositely disposed box sides; and detachably connecting said wire ends to a wire on the outside of the box sides.

16. A wirebound box comprising a plurality of side sections each consisting of cleats, side material and binding wires, and an end section positioned within the side sections and having a flexible binder secured thereto and extending thereacross and beyond opposite edges thereof, each end of the flexible binder on the end section being passed through a side section between a cleat and a binding wire and being bent to hold the end section in position.

17. A wirebound box comprising a plurality of side sections each consisting of cleats, side material and binding wires, and an end section positioned within the side sections and having a flexible fastener secured thereto and extending therefrom, the flexible fastener being passed through a side section between a cleat and a binding wire and being bent to hold the end section in position.

18. A foldable box blank comprising a plurality of side sections each consisting of side material and cleats connected together in foldable relationship by binding wires extending across the several sections and secured thereto; and an end section having a flexible binder secured thereto and extending beyond opposite edges thereof, one end of the flexible binder on the end section being passed through a side section between a cleat and a binding wire and bent to connect the end section to the side section, whereby when the side sections are folded into box form, the end section may be swung into end closing position and the other end of the flexible binder on the end section may be passed through an adjacent side section and bent to hold the end section in closed position in the completed box.

19. A foldable box blank comprising a plurality of side sections each consisting of side material and cleats connected together in foldable relationship by binding wires extending across the several sections and secured thereto; and an end section having a flexible fastener secured to each of opposite edges thereof and extending therefrom, one said fastener being passed through a side section between a cleat and a binding wire and bent to connect the end section to the side section, whereby when the side sections are folded into box form the end section may be swung into end closing position and the other fastener on the end section may be passed through an adjacent side section and bent to hold the end section in closed position in the completed box.

20. The method of securing a wired box end to the sides of a wired and cleat-reenforced box which consists in passing the wires on the box end through a side of the box between a cleat and a side wire binding and then bending the ends of the wires on the box end to connect the box end to the box side.

21. A wirebound box comprising a plurality of side sections each consisting of side material, interior cleats and exterior wire bindings, the side material, cleats and wire bindings being secured together by staples and the cleats of the several sections forming an interior cleat frame at each end of the box; and an end section positioned within a cleat frame and having a wire secured to the exterior of the section and extending thereacross and beyond opposite edges thereof, each end of said wire being bent back and secured to the end section to provide a U-shaped bight, and the bights thus formed being passed through adjacent side sections and bent to hold the end section in position.

22. A wirebound box comprising a plurality of side sections each consisting of side material, interior cleats and exterior wire bindings, the side material, cleats and wire bindings being secured together and the cleats of the several sections forming an interior cleat frame at each end of the box; and an end section positioned within a cleat frame and having U-shaped wire fasteners secured thereto and extending from opposite edges thereof, said fasteners being passed through a side section and bent to hold the end section in position.

23. A wirebound box comprising a plurality of side sections each consisting of side material, cleats and wire bindings, the side material, cleats and wire bindings being secured together and the cleats of the several sections forming a cleat frame at each end of the box; and an end section position within the side sections and having wire fasteners secured thereto and extending therefrom, said fasteners being passed through a side section and bent to hold the end section in position.

GUILFORD C. BABCOCK.
EARL R. STIVERS.